US008689099B1

(12) United States Patent
Hanni et al.

(10) Patent No.: US 8,689,099 B1
(45) Date of Patent: Apr. 1, 2014

(54) CROSS-DOMAIN COMMUNICATION

(75) Inventors: Jeremy B. Hanni, Seattle, WA (US);
Homan Lee, Seattle, WA (US); Zachary M. Shalla, Seattle, WA (US); Léon Thrane, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 541 days.

(21) Appl. No.: 12/978,116

(22) Filed: Dec. 23, 2010

(51) Int. Cl.
*G06F 17/00* (2006.01)

(52) U.S. Cl.
USPC .............................. 715/234; 715/240; 715/205

(58) Field of Classification Search
USPC ............................ 715/240, 234, 205, 200, 255
See application file for complete search history.

(56) References Cited

U.S. PATENT DOCUMENTS

| 8,108,771 | B2* | 1/2012 | Chijiiwa et al. | 715/240 |
| 8,386,784 | B2* | 2/2013 | Gao et al. | 713/171 |
| 2003/0037232 | A1* | 2/2003 | Bailiff | 713/153 |
| 2004/0054898 | A1* | 3/2004 | Chao et al. | 713/168 |
| 2007/0220148 | A1* | 9/2007 | Ganesan et al. | 709/226 |
| 2007/0299857 | A1* | 12/2007 | Gwozdz et al. | 707/102 |
| 2008/0195761 | A1* | 8/2008 | Jabri et al. | 709/250 |
| 2009/0037806 | A1* | 2/2009 | Yang et al. | 715/234 |
| 2009/0299862 | A1* | 12/2009 | Fan et al. | 705/14.73 |
| 2010/0197326 | A1* | 8/2010 | Ngo | 455/466 |
| 2010/0299205 | A1* | 11/2010 | Erdmann et al. | 705/14.54 |
| 2011/0274258 | A1* | 11/2011 | Casalaina et al. | 379/93.01 |
| 2012/0016749 | A1* | 1/2012 | Lisbakken | 705/14.71 |

OTHER PUBLICATIONS

U.S. Appl. No. 12/362,377, filed Jan. 29, 2009 titled "Cross-Domain Communication".
Julien Lecomte, "Introducing Cross Frame, a Safe Communication Mechanism Across Documents and Across Domains", Nov. 26, 2007, http://www.julienlecomte.net/blog/2007/11/31/.

* cited by examiner

*Primary Examiner* — Thu Huynh
(74) *Attorney, Agent, or Firm* — Thomas | Horstemeyer, LLP

(57) ABSTRACT

Disclosed are various embodiments for performing cross-domain communication using messenger frames. One or more messenger frames are dynamically generated in response to determining that a message is to be sent from a first frame in one domain to a second frame in another domain in a client. The message is sent from the first frame to the second frame by embedding the message in addresses of the messenger frames. Code executing in the first frame and code executing in the second frame are restricted from direct communication in the client.

27 Claims, 6 Drawing Sheets

CROSS-DOMAIN COMMUNICATION

BACKGROUND

As an increasing amount of information is being provided electronically, the number of sources providing such content is increasing as well. In many cases, a user browsing a Web page through a browser application, for example, might simultaneously view content from multiple sources, each of which might have a distinct domain, host address, or other such source identifier from which the content is provided. In many cases, the user will be unaware that the content is coming from multiple sources other than variations in aspects such as style or layout.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to cross-domain communication for network page frames. Most existing browsers and other such applications impose restrictions on cross-domain requests and cross-site scripting (XSS). Thus, a frame on a network page corresponding to a first domain cannot send information to a second frame on the network page corresponding to a second domain. Further, various frames or elements from a common provider may still correspond to different domains, or switch between different domains, such as secure and non-secure domains. Accordingly, even network pages from the same provider might be unable to determine information about a frame, object, or other element of the page if that element is from another domain. Although it may be desirable to pull in content from third party providers directly into a document object model (DOM) of a network page and interact with that content via JavaScript® or another appropriate language, such interaction would generally not comply with the Payment Card Industry Data Security Standard (PCI DSS) or other such standards.

Various embodiments of the present disclosure employ messenger frames to facilitate cross-domain communication between network page frames. Techniques related to using messenger frames for cross-domain communication are described in U.S. patent application entitled "Cross-Domain Communication" filed on Jan. 29, 2009 and assigned application Ser. No. 12/362,377, which is incorporated herein by reference in its entirety. In various embodiments herein, dynamically generated messenger frames are employed to send messages between domains irrespective of message length. Further, a uniform resource locator (URL) encoding may be employed so that arbitrary messages may be sent using the messenger frames. In the following discussion, a general description of the system and its components is provided, followed by a discussion of the operation of the same.

Figure 1:
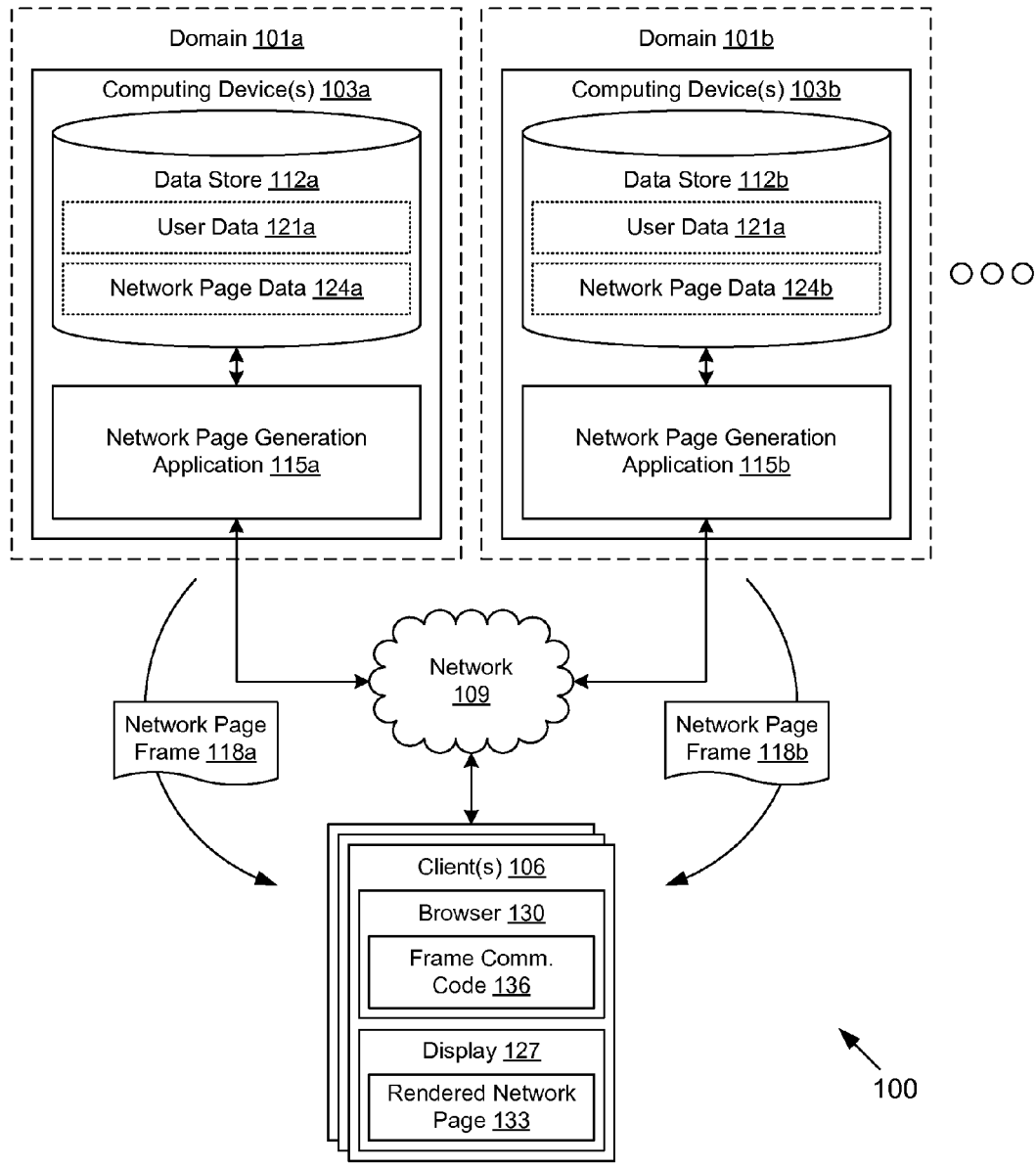
FIG. 1 is a drawing of a networked environment according to various embodiments of the present disclosure.

With reference to FIG. 1, shown is a networked environment 100 according to various embodiments. The networked environment 100 includes a plurality of domains 101. Generally, the term "domain" refers to an organized collection of network devices, applications, sites, and/or services, which typically are identified using a domain "name." Thus, a single content provider might utilize multiple domains for different purposes or having different aspects or capabilities. Further, different providers typically will utilize different domains. Although a common use of the term "domain" in such a context often currently refers to Internet-based technology, it should be understood that domains can be used in any appropriate network setting, and that advantages of embodiments discussed and suggested herein can be applied to any of these networks as appropriate.

The networked environment 100 further includes a plurality of computing devices 103 in data communication with one or more clients 106 by way of a network 109. In the example depicted in FIG. 1, two domains 101a and 101b are provided, where each is associated with a respective computing device 103a or 103b. Thus, each respective computing device 103a or 103b may correspond to servers controlled by different entities. However, it is understood that any number of domains 101, with any number of computing devices 103, may be employed in the networked environment 100. In some examples, a single computing device 103 may be associated with multiple domains 101. The network 109 includes, for example, the Internet, intranets, extranets, wide area networks (WANs), local area networks (LANs), wired networks, wireless networks, or other suitable networks, etc., or any combination of two or more such networks.

Each computing device 103a and 103b may comprise, for example, a server computer or any other system providing computing capability. Alternatively, a plurality of computing devices 103a and 103b may be employed that are arranged, for example, in one or more server banks or computer banks or other arrangements. For example, a plurality of computing devices 103a and 103b together may comprise a cloud computing resource, a grid computing resource, and/or any other distributed computing arrangement. Such computing devices 103a and 103b may be located in a single installation or may be distributed among many different geographical locations. For purposes of convenience, the computing device 103a and 103b are each referred to herein in the singular. Even though the computing device 103a and 103b are each referred to in the singular, it is understood that a plurality of computing devices 103a and 103b may be employed in the various arrangements as described above.

Various applications and/or other functionality may be executed in each computing device 103 according to various embodiments. Also, various data is stored in a data store 112a, 112b that is accessible to the respective computing device 103. Each data store 112 may be representative of a plurality of data stores 112 as can be appreciated. The data stored in each data store 112, for example, is associated with the operation of the various applications and/or functional entities described below.

The components executed on each computing device 103, for example, include a respective network page generation application 115 and other applications, services, processes, systems, engines, or functionality not discussed in detail herein. The network page generation application 115 is executed to generate and serve up network pages, such as web pages or other forms of network content. In various embodiments, the network page generation application 115 may include a commercially available hypertext transfer protocol (HTTP) server such as, for example, Apache® HTTP Server, Apache® Tomcat®, Microsoft® Internet Information Services (IIS), etc.

Such network pages served up by the network page generation application 115 may correspond to network page frames 118, which may in turn correspond to parent frames, frames defined within a frame set, inline frames (e.g., iframe elements), and/or other forms of network page frames 118. The network page frames 118 may include hypertext markup language (HTML), extensible markup language (XML), JavaScript®, asynchronous JavaScript® and XML (Ajax), and/or other data. The network page generation application 115 may also include code for updating the network page frame 118 within the network page frame 118. Such code may be configured to communicate with other network page frames 118 from different domains 101 through the use of messenger frames.

The data stored in each data store 112 includes, for example, user data 121, network page data 124, and potentially other data. The user data 121 may include various information about users of a network site, including state-related information used by the network page generation application 115 to serve up dynamic content. The network page data 124 includes various data used in generating the network page frames 118, such as, for example, code, templates, text, images, audio, video, and/or other data.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 127. The display 127 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 130 and/or other applications. The browser 130 may be executed in a client 106, for example, to access and render network pages, such as network page frames 118a and 118b, web pages, or other network content served up by the computing device 103a, the computing device 103b, and/or other servers, thereby generating a rendered network page 133 on the display 127. The network page frames 118a and 118b may include various client-side code to be executed in the browser 130. For example, the browser 130 may execute frame communication code 136 to facilitate cross-domain communication between the network page frame 118a and the network page frame 118b. The client 106 may be configured to execute applications beyond the browser 130 such as, for example, email applications, instant message applications, and/or other applications.

Next, a general description of the operation of the various components of the networked environment 100 is provided. To begin, a user at the client 106 requests a network page from a network site hosted by the computing device 103a in the domain 101a. In response, the network page generation application 115a serves up a network page frame 118a to the client 106. The network page frame 118a may correspond, for example, to a parent frame and/or a frame defined by a frameset. The network page frame 118a is associated with a DOM that is accessible by other network page frames 118a served up in the same domain 101a.

The network page frame 118a includes, or is related to by a frameset, a network page frame 118b that is served up by the network page generation application 115b in the computing device 103b of the domain 101b. Thus, the rendered network page 133 shown on the display 127 of the client 106 includes the network page frame 118a, the network page frame 118b, and/or other network page frames 118. In some examples, the network page frame 118b corresponds to an iframe included in the network page frame 118b. The network page frame 118b is associated with a different DOM. The DOM of the network page frame 118a cannot be accessed by the DOM of the network page frame 118b, and vice versa, because the network page frame 118a and the network page frame 118b are served up from different domains 101.

Included in the network page frames 118a and 118b is various code that obtains user input, performs computations, downloads data, and/or performs other tasks. Such code may correspond to JavaScript® or another suitable language. Such code in the network page frame 118a may be configured to communicate with the network page frame 118b through the use of the frame communication code 136, which is downloaded from the network page generation application 115a and 115b with the network page frames 118a and 118b. Again, it is noted that the code in the network page frame 118a is restricted from direct communication with code in the network page frame 118b.

To overcome such communication restrictions, the frame communication code 136 is configured to generate messenger frames to convey messages between the network page frames 118a and 118b. In one embodiment, the messenger frames correspond to iframes in the DOMs of the network page frames 118a, 118b. In particular, iframes may be used to provide a form of "sandboxing" in order to separate code obtained from multiple domains 101 for compliance with PCI DSS and/or other standards. Thus, a messenger frame that is in the domain 101b of the network page frame 118b may be created in the DOM of the network page frame 118a.

The network page frame 118a may provide a message to the messenger frame by way of the address field or uniform resource locator (URL) of the messenger frame. The query string and/or the fragment identifier of the URL may be used in conveying the message. In various embodiments, the message may be encoded using a URL-compliant encoding such as, for example, Base64, Uuencoding, and/or other forms of URL-compliant encodings. Consequently, characters and data that may ordinarily be disallowed in URLs may be used in the messages by employing such an encoding.

The browser 130 may impose a character limit for URLs. As a non-limiting example, the character limit may be 2083 characters or some other value. The character limit may vary according to which browser 130 is executed in the client 106.

However, in various embodiments, the frame communication code 136 may allow for messages of arbitrary length to be sent. To accomplish this, multiple message frames may be used. After URL encoding, the message may be split into multiple message segments, with each segment being sent by way of a respective messenger frame. Each message segment may be sent along with a respective sequence number, with the last message segment having a flag denoting that segment as the last one of the message.

Using multiple message frames to send multiple messages or a multi-segment message can speed up the communication process through parallelization. Subsequent messages or message segments may be sent by the network page frame 118a without having to wait for processing of the message or message segment by the network page frame 118b. In other words, the message or segments may be sent in parallel. However, in some embodiments, a single message frame, or fewer message frames than messages or segments, may be utilized for sending multiple messages or message segments. In other words, the messages or segments may be sent serially. In such embodiments, the address field is updated with a subsequent message segment after the message is obtained by the recipient network page frame 118b. In some embodiments, a message frame may be selected by the frame communication code 136 from a pool of existing and/or dynamically created message frames for reuse.

Although messenger frames may correspond to static iframe elements within a DOM of the network page frame 118a or 118b, in various embodiments, the message frames may be dynamically generated. Thus, any limitations on numbers of concurrent messages would be based on the memory in the client 106 that is available to the browser 130, and not the number of statically defined messenger frames. Further, dynamically generated messenger frames may lead to lower overall latency relative to statically defined messenger frames, as each message is executed in parallel. In addition, a cache used by the browser 130 in some embodiments may allow for high performance dynamic generation of messenger frames, as the frame communication code 136 may be static.

The messenger frame, which is executed in the domain 101b of the recipient network page frame 118b, may be configured to access the DOM of the network page frame 118b and/or interact with code executing in the network page frame 118b. Also, the messenger frame may be configured to make callbacks to the sending network page frame 118a. Each network page frame 118a and 118b may be configured to create new messenger frames independently for bi-directional messaging, which avoids waiting associated with the return of a messenger frame. It is understood that the message may be passed according to an application programming interface (API) agreed upon by the operators of the domains 101a and 101b. To this end, the frame communication code 136 included within the network page frames 118a and 118b may be symmetrical, with mutually agreed upon types of arguments being sent within the message.

Figure 2:
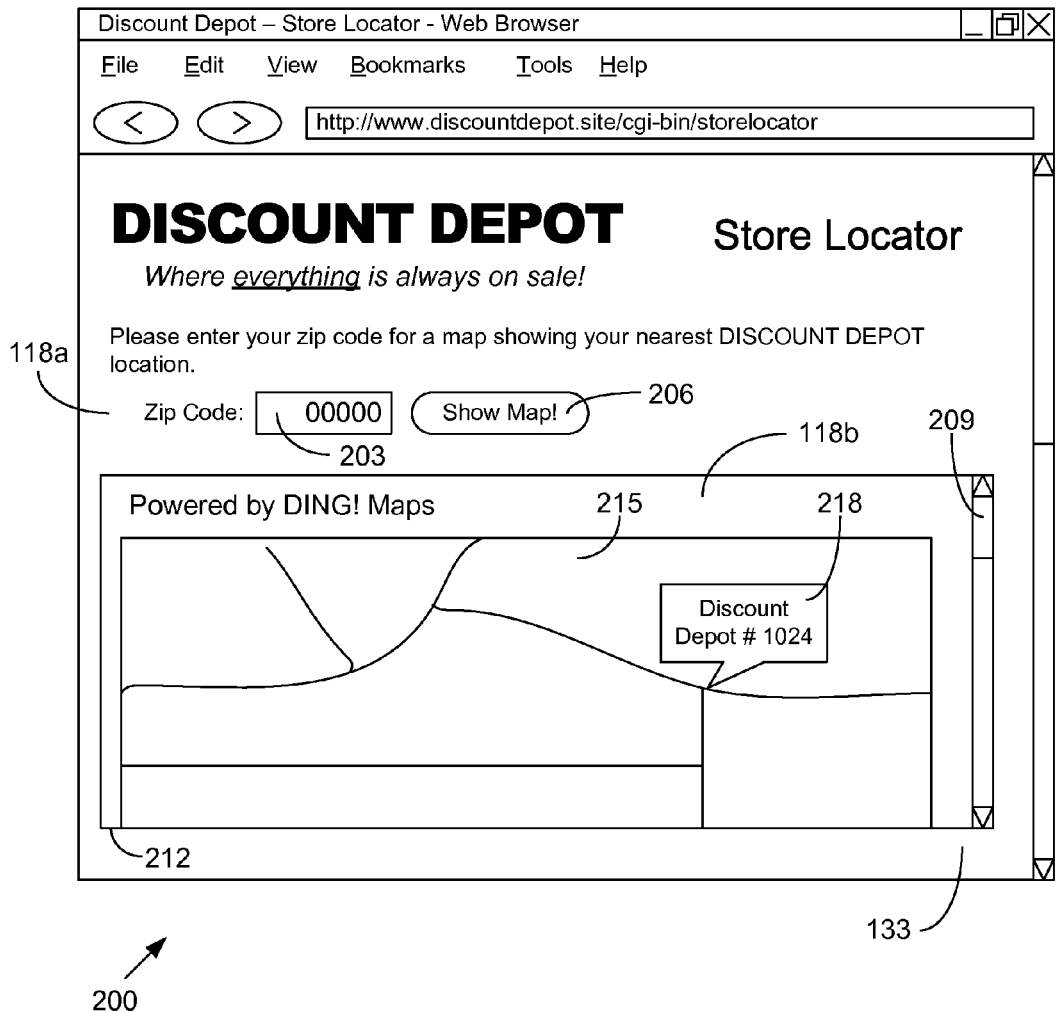
FIG. 2 is a drawing of an example of a user interface rendered by a client in the networked environment of FIG. 1 according to various embodiments of the present disclosure.

Turning now to FIG. 2, shown is a user interface 200 that is rendered by a browser 130 (FIG. 1) executed in a client 106 (FIG. 1) in the networked environment 100 (FIG. 1) according to one non-limiting example. Specifically, FIG. 2 illustrates a rendered network page 133 that includes a network page frame 118a and a network page frame 118b. The network page frame 118a corresponds to a store locator page for a network site of a retail store. The network page frame 118a may be associated with a domain 101a (FIG. 1) of the retail store, e.g., "www.discountdepot.site." The network page frame 118a includes a location entry component 203 and a location submission component 206 for a user to enter and submit a zip code from which a store locator map is generated.

The store locator map is rendered in the network page frame 118b, which may be an iframe element within the network page frame 118a. Although the network page frame 118b is depicted as having scrollbars 209 and a viewport surrounded by a border 212, it is understood that the network page frame 118b may be visually indistinguishable from the network page frame 118a in other examples. The map 215 in the network page frame 118b is served up by a network page generation application 115b (FIG. 1) by another domain 101b (FIG. 1), e.g., "maps.ding.site." A store indicator 218 is rendered in the map 215 to indicate a store location on the map 215.

When a user enters a zip code in the location entry component 203 and selects the location submission component 206, the network page frame 118a sends a message to the network page frame 118b by way of the frame communication code 136 (FIG. 1). The message may encode, for example, the requested zip code and the locations (e.g., coordinates in latitude and longitude) of nearby stores according to data in the data store 112a (FIG. 1) of the domain 101a.

A messenger frame is generated, with message being embedded in the URL of the messenger frame. It is noted that the messenger frame is not shown to be visible in FIG. 2. In the embodiment of FIG. 2, the messenger frame corresponds to a hidden iframe, with a height and width of zero pixels. However, it is understood that the messenger frame may be visible in other embodiments. The frame communication code 136 of the messenger frame may make various API calls, manipulate the DOM, and/or otherwise deliver the message to the domain 101b. Consequently, the network page generation application 115b generates and sends an updated map 215 to the client 106 for rendering in the network page frame 118b.

Figure 3:
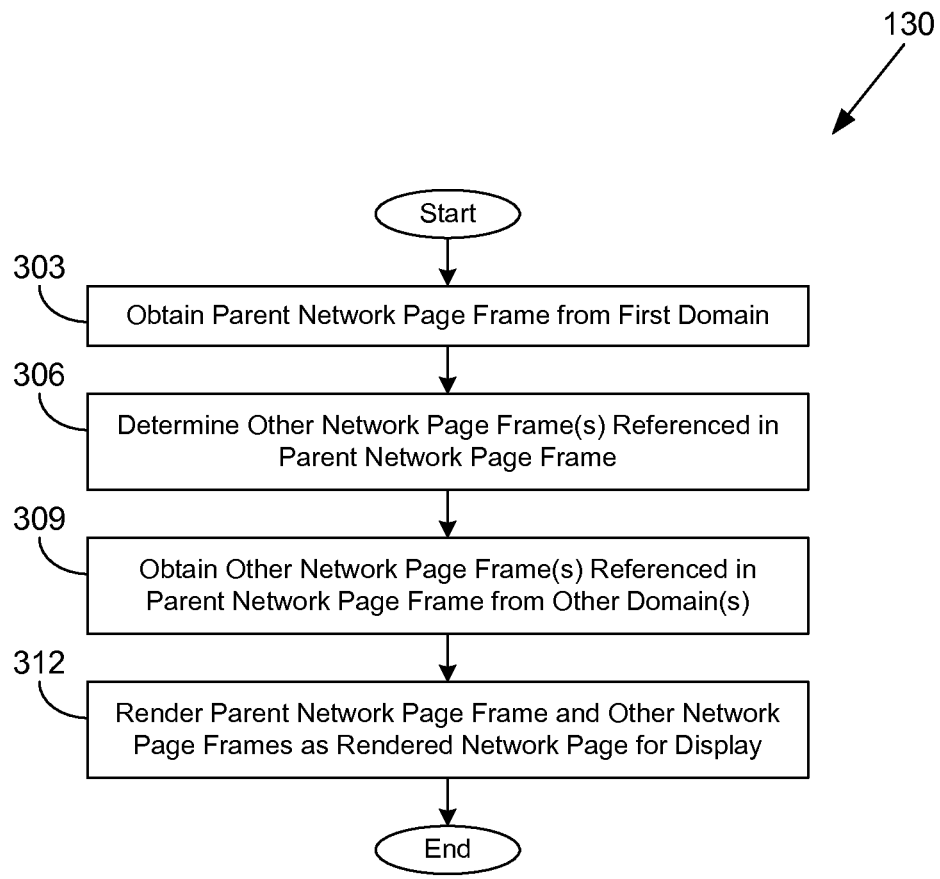
FIG. 3 is a flowchart illustrating one example of functionality implemented as portions of a browser executed in a client in the networked environment of FIG. 1 according to various embodiments of the present disclosure.

Referring next to FIG. 3, shown is a flowchart that provides one example of the operation of a portion of the browser 130 according to various embodiments. It is understood that the flowchart of FIG. 3 provides merely an example of the many different types of functional arrangements that may be employed to implement the operation of the portion of the browser 130 as described herein. As an alternative, the flowchart of FIG. 3 may be viewed as depicting an example of steps of a method implemented in the client 106 (FIG. 1) according to one or more embodiments.

Beginning with box 303, the browser 130 obtains a parent network page frame 118a (FIG. 1) from a network page generation application 115a (FIG. 1) in the first domain 101a (FIG. 1). In box 306, the browser 130 determines other network page frames 118b (FIG. 1) that are referenced in the parent network page frame 118a. As a non-limiting example, the parent network page frame 118a may include one or more iframe elements corresponding to network page frames 118b. As another non-limiting example, the parent network page frame 118a may be related to one or more other network page frames 118b by a frameset.

In box 309, the browser 130 obtains the other network page frames 118b that are referenced in, or are related to, the parent network page frame 118a from network page generation applications 115b (FIG. 1) executed in other domains 101b (FIG. 1). In box 312, the browser 130 renders the parent network page frame 118a and the other network page frames 118b as the rendered network page 133 (FIG. 1) to be shown on the display 127 (FIG. 1). Thereafter, the portion of the browser 130 ends.

Figure 4A:
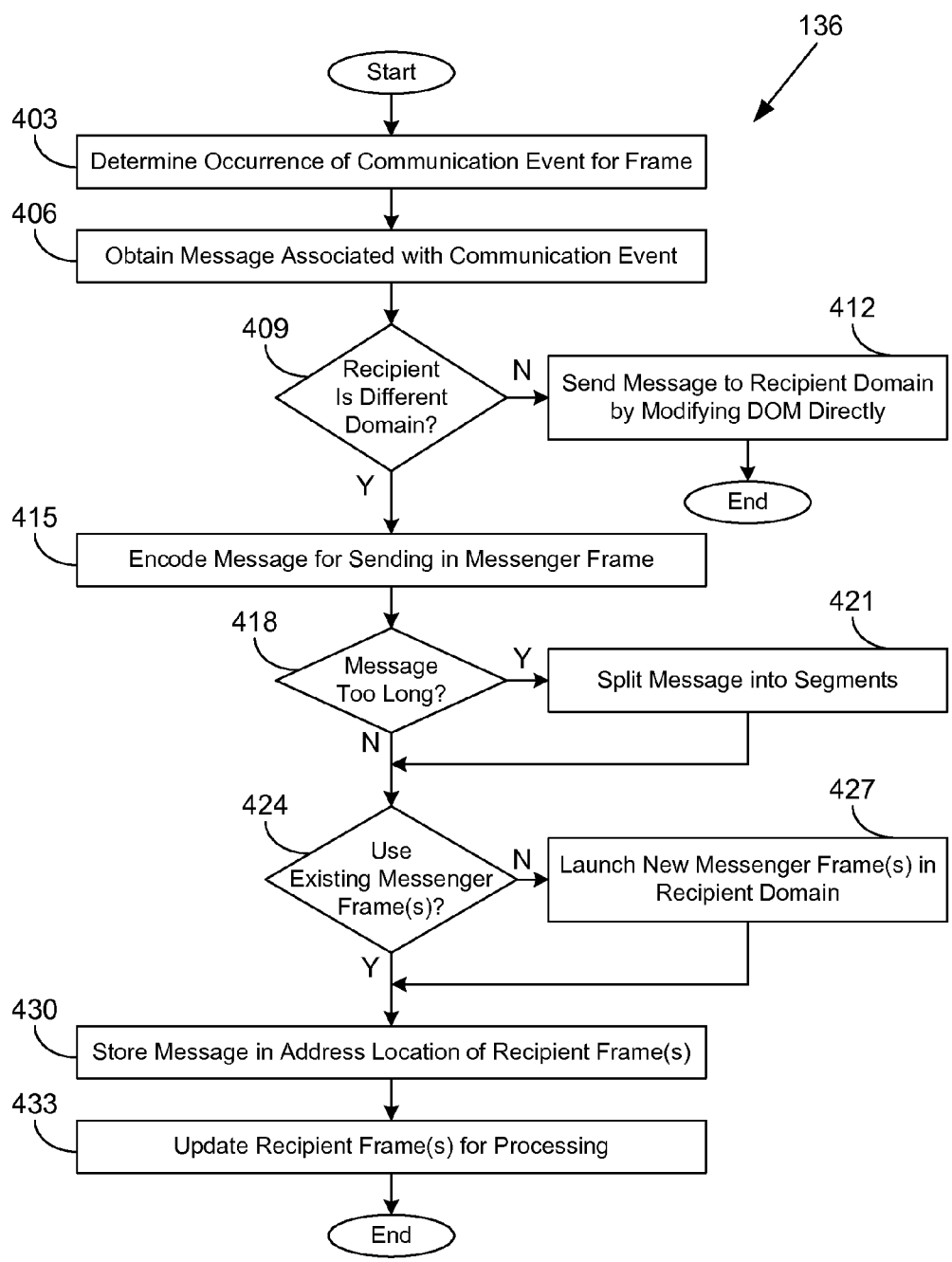
FIGS. 4A and 4B are flowcharts illustrating examples of functionality implemented as portions of frame communication code executed in a client in the networked environment of FIG. 1 according to various embodiments of the present disclosure.

Moving on to FIG. 4A, shown is a flowchart that provides one example of the operation of a portion of the frame communication code 136 according to various embodiments. It is understood that the flowchart of FIG. 4A provides merely an example of the many different types of functional arrangements that may be employed to implement the operation of the portion of the frame communication code 136 as described herein. As an alternative, the flowchart of FIG. 4A may be viewed as depicting an example of steps of a method implemented in the client 106 (FIG. 1) according to one or more embodiments.

Beginning with box 403, the frame communication code 136 determines that a communication event has occurred for a network page frame 118a (FIG. 1). In other words, code executed from the network page frame 118a has obtained user input, performed a task, etc. so that event indicating a request for communication is generated. In box 406, the frame communication code 136 obtains a message associated with the communication event. The message may include multiple arguments according to an API supported by the frame communication code 136 and the network page frames 118a and 118b (FIG. 1).

In box 409, the frame communication code 136 determines whether the recipient of the message (i.e., a frame) is in a different domain 101b (FIG. 1) compared to the domain 101a (FIG. 1) associated with the network page frame 118a. If the frame communication code 136 determines that the recipient is not in a different domain 101b, in box 412, the frame communication code 136 sends the message to the recipient in the domain 101a by modifying the DOM directly. Thereafter, the portion of the frame communication code ends.

Otherwise, if the frame communication code 136 determines in box 409 that the recipient is in a different domain 101b, the frame communication code 136 proceeds to box 415. In box 415, the frame communication code 136 encodes the message for sending in one or more messenger frames. To this end, the frame communication code 136 may employ an encoding such as Base64 or another URL compliant encoding in order to include the message in a URL for the messenger frame.

In box 418, the frame communication code 136 determines whether the encoded message is too long, or exceeds a maximum encoded message length associated with the messenger frame and the browser 130 (FIG. 1). If the frame communication code 136 determines that the encoded message is too long, the frame communication code 136 splits the message into multiple message segments in box 421. The frame communication code 136 then proceeds to box 424. If the frame communication code 136 determines that the encoded message is not too long to be sent in a single messenger frame, the frame communication code 136 also proceeds to box 424.

In box 424, the frame communication code 136 determines whether existing messenger frames are to be used to send the message. For example, a pool of messenger frames may be available. If existing messenger frames are not to be used, the frame communication code 136 continues to box 427. In box 427, the frame communication code 136 launches one or more new messenger frames in the recipient domain 101b. Thereafter, the frame communication code 136 proceeds to box 430. Otherwise, if the frame communication code 136 determines that existing messenger frames are to be used, the frame communication code 136 also continues to box 430.

In box 430, the frame communication code 136 embeds the encoded message in the address location (or URL) of the recipient messenger frame(s). In box 433, the frame communication code 136 may update the recipient messenger frame (s) so that they may be processed. Thus, code associated with the messenger frames may execute and cause the message to be sent to the recipient network page frame(s) 118b. In one embodiment, the network page frame(s) 118b may poll the address field of the messenger frame(s) to obtain the message or message segments. Thereafter, the portion of the frame communication code 136 ends.

Figure 4B:
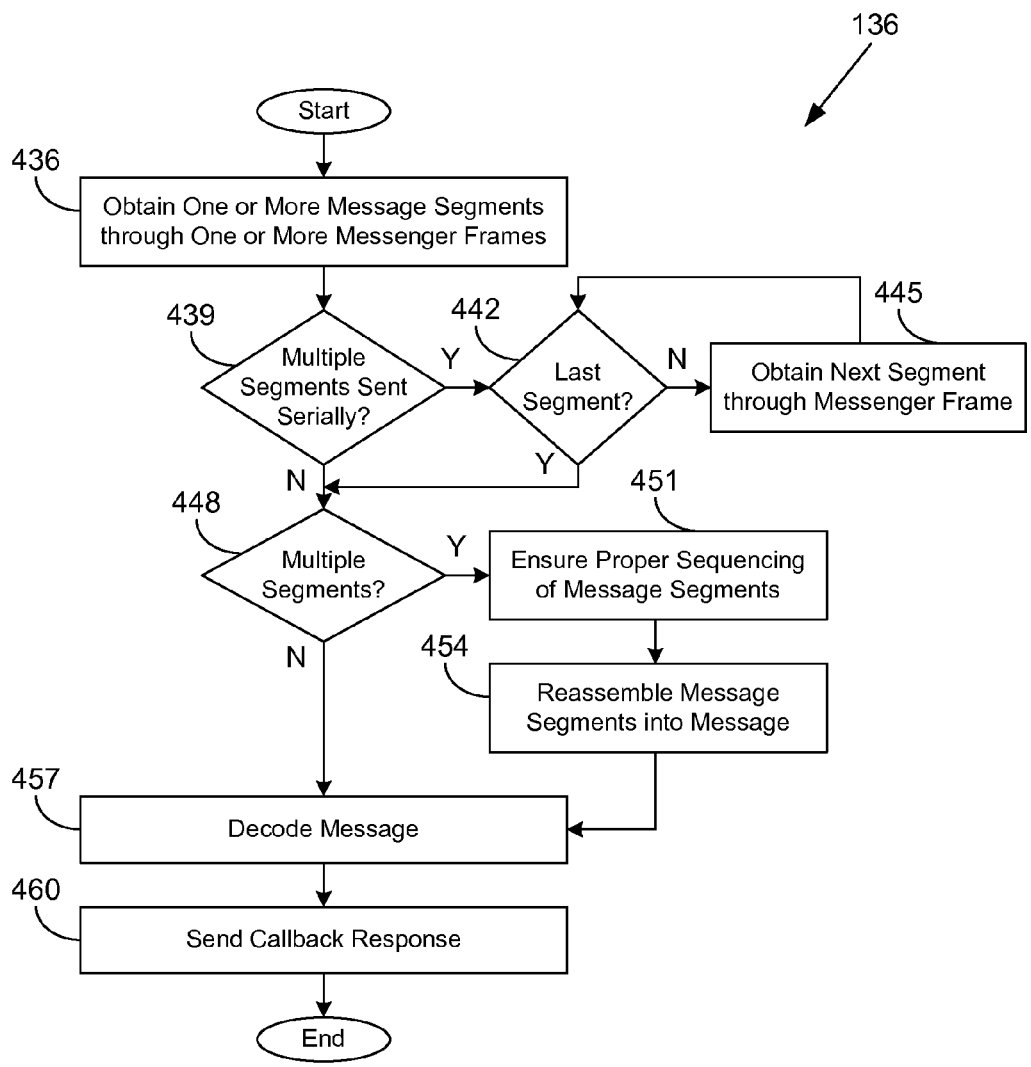

Turning now to FIG. 4B, shown is a flowchart that provides one example of the operation of another portion of the frame communication code 136 according to various embodiments. It is understood that the flowchart of FIG. 4B provides merely an example of the many different types of functional arrangements that may be employed to implement the operation of the portion of the frame communication code 136 as described herein. As an alternative, the flowchart of FIG. 4B may be viewed as depicting an example of steps of a method implemented in the client 106 (FIG. 1) according to one or more embodiments.

Beginning with box 436, the frame communication code 136 obtains one or more message segments through one or more messenger frames. In box 439, the frame communication code 136 determines whether a message is being obtained through multiple message segments that are being sent serially. If the message is being obtained through multiple message segments that are being sent serially, the frame communication code 136 continues to box 442 and determines whether the last message segment has been obtained.

If the last message segment has not yet been obtained, the frame communication code 136 moves to box 445 and obtains the next message segment through the messenger frame or frames that are being used for the serial transfer. In some embodiments, the frame communication code 136 may acknowledge the receipt of the message segment to the sender. The frame communication code 136 then returns to box 442. If the frame communication code 136 determines in box 442 that the last message segment has been obtained, the frame communication code 136 instead progresses to box 448. If the frame communication code 136 determines in box 439 that the message is not being sent serially by multiple segments, the frame communication code 136 also progresses to box 448.

In box 448, the frame communication code 136 determines whether the message has been obtained through multiple message segments. If the message has been obtained through multiple message segments, the frame communication code 136 continues to box 451 and ensures the proper sequencing of message segments. To this end, the frame communication code 136 may reorder the message segments according to a sequence number associated with each message segment. In box 454, the frame communication code 136 reassembles the message segments into a message. The frame communication code 136 then continues to box 457. If the frame communication code 136 determines in box 448 that the message has not been obtained through multiple message segments, the frame communication code 136 also continues to box 457.

In box 457, the frame communication code 136 decodes the message. In some embodiments, the message may have been encoded using a type of uniform resource locator (URL) compliant encoding such as Base64, Uuencoding, etc. In box 460, the frame communication code 136 sends a callback response to the sender of the message, if the frame communication code 136 is configured to acknowledge the message. To this end, the frame communication code 136 may send another message using the same messenger frame(s) or different messenger frame(s). Thereafter, the portion of the frame communication code 136 ends.

Figure 5:
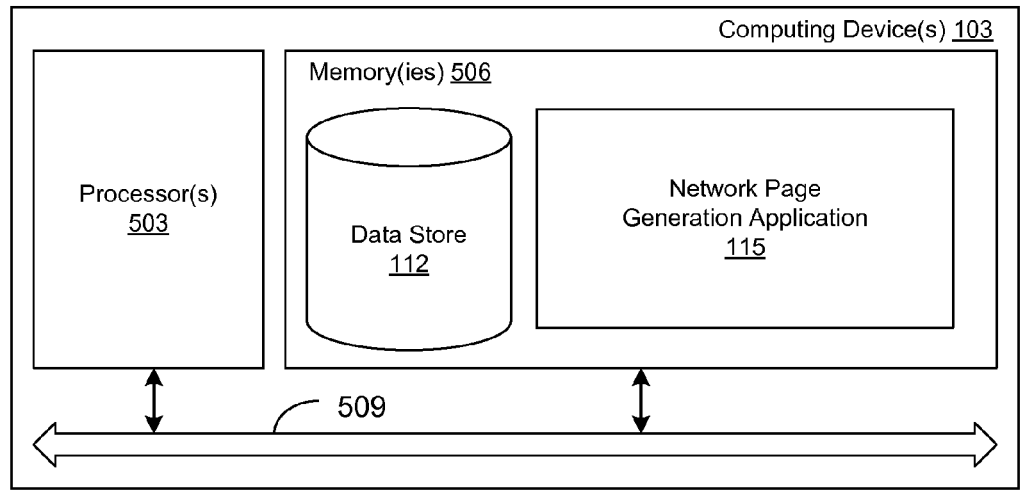
FIG. 5 is a schematic block diagram that provides one example illustration of a computing device employed in the networked environment of FIG. 1 according to various embodiments of the present disclosure.

With reference to FIG. 5, shown is a schematic block diagram of an exemplary computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 is a network page generation application 115 and potentially other applications. Also stored in the memory 506 may be a data store 112 and other data. In addition, an operating system may be stored in the memory 506 and executable by the processor 503.

Figure 6:
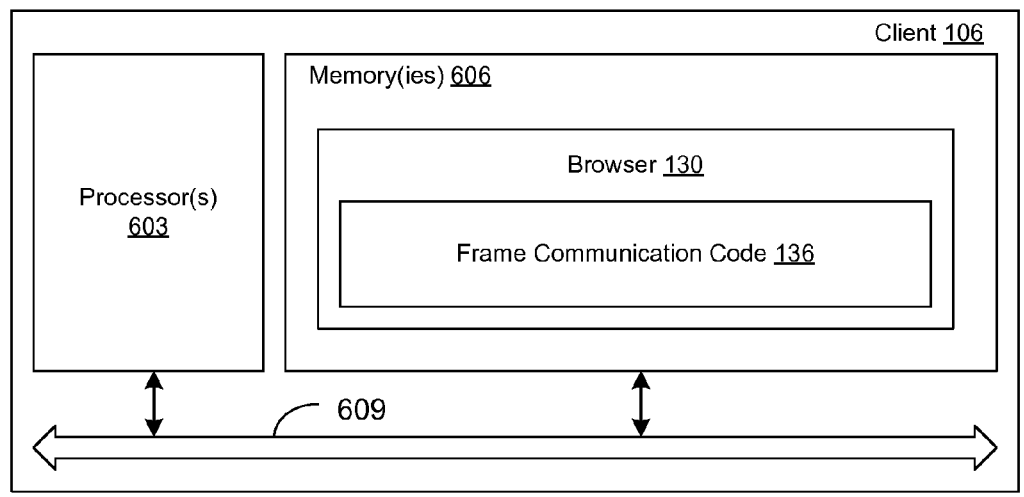
FIG. 6 is a schematic block diagram that provides one example illustration of a client employed in the networked environment of FIG. 1 according to various embodiments of the present disclosure.

With reference to FIG. 6, shown is a schematic block diagram of the client 106 according to an embodiment of the present disclosure. The client 106 includes at least one processor circuit, for example, having a processor 603 and a memory 606, both of which are coupled to a local interface 609. To this end, the client 106 may comprise, for example, at least one client computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 is the browser 130 and potentially other applications. Associated with the browser 130 is the frame communication code 136. In addition, an operating system may be stored in the memory 606 and executable by the processor 603.

Referring now to both FIGS. 5 and 6, it is understood that there may be other applications that are stored in the memory 506, 606 and are executable by the processors 503, 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506, 606 and are executable by the processor 503, 603. In this respect, the term "executable" means a program file that is in a form that can ultimately be run by the processor 503, 603. Examples of executable programs may be, for example, a compiled program that can be translated into machine code in a format that can be loaded into a random access portion of the memory 506, 606 and run by the processor 503, 603, source code that may be expressed in proper format such as object code that is capable of being loaded into a random access portion of the memory 506, 606 and executed by the processor 503, 603, or source code that may be interpreted by another executable program to generate instructions in a random access portion of the memory 506, 606 to be executed by the processor 503, 603, etc. An executable program may be stored in any portion or component of the memory 506, 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506, 606 is defined herein as including both volatile and nonvolatile memory and data storage components. Volatile components are those that do not retain data values upon loss of power. Nonvolatile components are those that retain data upon a loss of power. Thus, the memory 506, 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503, 603 may represent multiple processors 503, 603 and the memory 506, 606 may represent multiple memories 506, 606 that operate in parallel processing circuits, respectively. In such a case, the local interface 509, 609 may be an appropriate network 109 (FIG. 1) that facilitates communication between any two of the multiple processors 503, 603, between any processor 503, 603 and any of the memories 506, 606, or between any two of the memories 506, 606, etc. The local interface 509, 609 may comprise additional systems designed to coordinate this communication, including, for example, performing load balancing. The processor 503, 603 may be of electrical or of some other available construction.

Although the network page generation application 115, the browser 130, the frame communication code 136, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3, 4A, and 4B show the functionality and operation of an implementation of portions of the browser 130 and the frame communication code 136. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503, 603 in a computer system or other system. The machine code may be converted from the source code, etc. If embodied in hardware, each block may represent a circuit or a number of interconnected circuits to implement the specified logical function(s).

Although the flowcharts of FIGS. 3, 4A, and 4B show a specific order of execution, it is understood that the order of execution may differ from that which is depicted. For example, the order of execution of two or more blocks may be scrambled relative to the order shown. Also, two or more blocks shown in succession in FIGS. 3, 4A, and 4B may be executed concurrently or with partial concurrence. Further, in some embodiments, one or more of the blocks shown in FIGS. 3, 4A, and 4B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page generation application 115, the browser 130, and the frame communication code 136, that comprises software or code can be embodied in any non-transitory computer-readable medium for use by or in connection with an instruction execution system such as, for example, a processor 503, 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that determines that a message is to be sent from code executing in a first network page frame to code executing in a second network page frame, wherein the first network page frame is from a first network site, the second network page frame is from a second network site, and the first network page frame and the second network page frame are configured to be rendered together as a network page;
   code that determines whether a first domain of the first network site differs from a second domain of the second network site in response to determining that the message is to be sent from the code executing in the first network page frame to the code executing in the second network page frame;
   code that sends the message to the code executing in the second network page frame by modifying a document object model (DOM) of the second network page frame to include the message when the first domain is determined not to differ from the second domain; and
   code that, when the first domain is determined to differ from the second domain;
      dynamically generates a plurality of messenger frames in the second domain;
      encodes the message using a uniform resource locator (URL) compliant encoding;
      sends the message from the code executing in first network page frame to the code executing in second network page frame by splitting the message into a plurality of message segments based at least in part on a length of the message and embedding individual ones of the plurality of message segments in a query string portion of an address of a corresponding one of the plurality of messenger frames;
      wherein individual ones of the plurality of messenger frames corresponds to a respective iframe element in another DOM of the first network page frame; and
      wherein the code executing in the first network page frame and the code executing in the second network page frame are restricted from direct communication when the first domain is determined to differ from the second domain.

2. A method, comprising:
   determining, via one or more client computing devices, that a message is to be sent from code executing in a first network page frame to code executing in a second network page frame, wherein the first network page frame is from a first network site, the second network page frame is from a second network site, and the first network page frame and the second network page frame are configured to be rendered together as a network page;
   determining, via at least one of the one or more client computing devices, whether a first domain of the first network site differs from a second domain of the second network site in response to determining that the message is to be sent from the code executing in the first network page frame to the code executing in the second network page frame;
   sending the message to the second network page frame by modifying a document object model (DOM) of the second network page frame to include the message when the first domain is determined not to differ from the second domain; and
   when the first domain is determined to differ from the second domain:
      dynamically generating, via at least one of the one or more client computing devices, at least one messenger frame in the second domain;
      encoding, via at least one of the one or more client computing devices, the message using a uniform resource locator (URL) compliant encoding;
      sending, via at least one of the one or more client computing devices, the message from the code executing in first network page frame to the code executing in second network page frame by embedding the message in an address of the at least one messenger frame; and
      wherein the code executing in the first network page frame and the code executing in the second network page frame are restricted from direct communication in the one or more client computing devices when the first domain is determined to differ from the second domain.

3. The method of claim 2, wherein the first network site is hosted by a first server, the second network site is hosted by a second server, and the first server and the second server are controlled by different entities.

4. The method of claim 2, wherein the second network page frame corresponds to an iframe element within another document object model (DOM) of the first network page frame.

5. The method of claim 2, wherein the first network page frame corresponds to an iframe element within the document object model (DOM) of the second network page frame.

6. The method of claim 2, wherein the URL compliant encoding includes a Base64 encoding.

7. The method of claim 2, wherein sending the message when the first domain is determined to differ from the second domain further comprises:
  determining, via at least one of the one or more client computing devices, whether the message exceeds a maximum encoded message length;
  splitting, via at least one of the one or more client computing devices, the message into a plurality of message segments when the message exceeds the maximum encoded message length; and
  embedding, via at least one of the one or more client computing devices, individual ones of the plurality of message segments into the address of a corresponding one of the at least one messenger frame.

8. The method of claim 7, wherein dynamically generating the at least one message frame further comprises determining, via at least one of the one or more client computing devices, a quantity of messenger frames to be dynamically generated based at least in part on the maximum encoded message length and the message.

9. The method of claim 7, wherein determining whether the message exceeds the maximum encoded message length further comprises determining, via at least one of the one or more client computing devices, the maximum encoded message length based at least in part on a browser application that is rendering the network page.

10. The method of claim 2, wherein the message includes a plurality of arguments defined in an application programming interface (API) supported by the code executing in the first network page frame and the code executing in the second network page frame.

11. The method of claim 2, wherein the at least one messenger frame corresponds to at least one hidden iframe element in another DOM of the first network page frame.

12. The method of claim 2, further comprising, in response to determining that the first domain differs from the second domain, sending, via at least one of the one or more client computing devices, a callback message from the code executing in the second network page frame to the code executing in the first network page frame using the at least one messenger frame in response to the message.

13. A system, comprising:
  at least one computing device; and
  a network page generation application executable in the at least one computing device, the network page generation application comprising:
    logic that receives a request for a network page frame from a client;
    logic that sends the network page frame and code that updates the network page frame to the client, wherein the code that updates the network page frame includes:
      code that determines whether a first domain of the network page frame differs from a second domain of another network page frame in response to determining that a message is to be sent from the network page frame to the another network page frame, wherein the network page frame and the another network page frame are configured to be rendered together as a network page;
      code that modifies a document object model (DOM) of the another network page to include the message to be sent from the network page frame to the another network page frame when the first domain is determined not to differ from the second domain; and
      code that, when the first domain is determined to differ from the second domain:
        generates a plurality of messenger frames in the second domain;
        divides the message into a plurality of message segments based at least in part on a maximum length of an address field;
        encodes the message using a uniform resource locator (URL) compliant encoding before dividing the message into the plurality of message segments; and
        sends individual ones of the plurality of message segments to the another network page frame in the second domain using a corresponding messenger frame from the plurality of messenger frames, wherein the address field of the corresponding messenger frame is set to include one of the plurality of message segments; and
      wherein the code that updates the network page frame is restricted from direct communication with the another network page frame when the first domain of the network page frame is determined to differ from the second domain of the another network page frame.

14. The system of claim 13, wherein the network page frame includes the another network page frame as an iframe element.

15. The system of claim 13, wherein the network page frame includes the corresponding messenger frame as a hidden iframe element.

16. The system of claim 13, wherein the code that updates the network page frame further includes code that dynamically generates the corresponding messenger frame in another DOM of the network page frame.

17. The system of claim 13, wherein the code that updates the network page frame further includes code that, when the first domain is determined to differ from the second domain, receives the corresponding messenger frame from a pool of available messenger frames.

18. The system of claim 13, wherein the code that updates the network page frame further includes code that when the first domain is determined to differ from the second domain, obtains another message from the another network page frame by way of at least one messenger frame.

19. The system of claim 13, wherein the code that updates the network page frame further includes code that when the first domain is determined to differ from the second domain, identifies the maximum length of the address field according to a browser application executing in the client.

20. A system, comprising:
  at least one computing device; and
  a network page generation application executable in the at least one computing device, the network page generation application comprising:

logic that receives a request for a network page frame from a client;

logic that sends the network page frame and code that updates the network page frame to the client, wherein the code that updates the network page frame includes:

code that determines whether a first domain of the network page frame differs from a second domain in another network page frame in response to determining that a message is to be sent from the network page frame to the another network page frame, wherein the network page frame and the another network page frame are configured to be rendered together as a network page;

code that modifies a document object model (DOM) of the another network page to include the message to be sent from the network page frame to the another network page frame when the first domain is determined not to differ from the second domain; and code that, when the first domain is determined to differ from the second domain:

generates at least one messenger frame in the second domain;

generates an encoded message by encoding the message using a uniform resource locator (URL) compliant encoding; and sends the encoded message to the another network page frame in the second domain using the at least one messenger frame, wherein the encoded message is embedded in an address field of the at least one messenger frame; and wherein the code that updates the network page frame is restricted from direct communication with the another network page frame when the first domain of the network page frame is determined to differ from the second domain of the another network page frame.

21. The system of claim 20, wherein the network page frame includes the another network page frame as an iframe element.

22. The system of claim 20, wherein the network page frame includes the messenger frame as a hidden iframe element.

23. The system of claim 20, wherein the code that updates the network page frame further includes code that dynamically generates the at least one messenger frame in another DOM of the network page frame.

24. The system of claim 20, wherein the code that updates the network page frame further includes:

code that divides the encoded message into a plurality of message segments based at least in part on a maximum length of the address field; and wherein the code that sends the encoded message to another network page frame is further configured to send individual ones of the plurality of message segments to the another network page frame in parallel using a corresponding messenger frame in the second domain, wherein the address field of the corresponding messenger frame is set to include one of the plurality of message segments.

25. The system of claim 20, wherein the code that updates the network page frame further includes:

code that divides the encoded message into a plurality of message segments based at least in part on a maximum length of the address field; and wherein the code that sends the encoded message to another network page frame is further configured to send individual ones of the plurality of message segments to the another network page frame serially using the messenger frame.

26. The system of claim 20, wherein the code that updates the network page frame further includes code that identifies a maximum length of the address field according to a browser application executing in the client.

27. The system of claim 20, wherein the code that updates the network page frame further includes code that determines whether the encoded message exceeds a maximum length of the address field.

\* \* \* \* \*

UNITED STATES PATENT AND TRADEMARK OFFICE
CERTIFICATE OF CORRECTION

PATENT NO. : 8,689,099 B1  
APPLICATION NO. : 12/978116  
DATED : April 1, 2014  
INVENTOR(S) : Hanni et al.

Page 1 of 1

It is certified that error appears in the above-identified patent and that said Letters Patent is hereby corrected as shown below:

In the Claims

Column 12, line 12, Claim 1 after "in" insert --the--

Column 12, line 13, Claim 1 after "in" insert --the--

Column 12, line 61, Claim 2 delete "in first" and replace with --in the first--

Column 12, line 62, Claim 2 before "second" insert --a--

Column 13, line 31, Claim 8 delete "message" and replace with --messenger--

Column 14, line 10, Claim 13 after "page" insert --frame--

Column 15, line 16, Claim 20 after "page" insert --frame--

Column 16, line 2, Claim 22 after "the" insert --at least one--

Column 16, line 14, Claim 24 before "another" insert --the--

Column 16, line 27, Claim 25 before "another" insert --the--

Column 16, line 29, Claim 25 after "using the" insert --at least one--

Signed and Sealed this  
Fourteenth Day of October, 2014

Michelle K. Lee  
*Deputy Director of the United States Patent and Trademark Office*